3,741,961
METAL CATALYZED CYCLIZATION OF ORGANIC NITRILES AND AMINO ALCOHOLS OR AMINO THIOLS
James Edward Kmiecik, Houston, and Heinz Schulze, Austin, Tex., assignors to Jefferson Chemical Company, Inc., Houston, Tex.
No Drawing. Filed Sept. 3, 1970, Ser. No. 69,502
Int. Cl. C07d 93/06
U.S. Cl. 260—243 R                                          20 Claims

ABSTRACT OF THE DISCLOSURE

Amino alcohols or amino thiols are contacted with organic nitriles under alkaline or neutral conditions in the presence of metal catalysts to form 2-oxazolines, 2-thiazolines, or related compounds, such as benzoxazoles or oxazines.

---

This invention relates to a metal catalyzed process for synthesizing heterocyclic compounds from organic nitriles and amino alcohols or amino thiols.

A conventional method heretofore employed for the synthesis of 2-oxazolines, benzoxazoles, oxazines, related compounds, and the like, is the cyclization of N-substituted carboxamides in an acidic environment. Although generally recognized, this typical process has serious disadvantages attended thereto. In particular, unfavorably poor yields of the desired product are often obtained and it is not uncommon for the desired product to polymerize.

Other processes for producing oxazolines have also been reported. Exemplary are the cyclization of carboxylic acids and aminoalkanolamines; reaction product produced from amidine and oxirane or thiirane compounds; from acid chlorides and ethyleneimines; and from nitriles and alkanolamines under the inuence of alkaline catalysts. A new, direct, and improved process for producing these products in surprisingly high yields has now been discovered.

Accordingly, we have found that if 1,2- or 1,3-amino alcohols of amino thiols are contacted with organic nitriles under alkaline or neutral conditions in the presence of particular metal catalysts 2-oxazolines, 2-thiazolines, benzoxazoles, benzothiazoles, 1,3-oxazines, and 1,3-thiazines, and related compounds, can be readily produced in surprisingly high yields.

Our process of catalytic cyclization is carried out by charging an organic nitrile, an amino thiol or amino alcohol, and a catalytic quantity of a particular metal catalyst to a suitable reaction vessel, such as a flask equipped with a reflux condenser, and the mixture heated and/or refluxed, using conventional techniques, until the desired product is produced.

The reaction is carried out at temperatures generally in the range from about 60–150° C., preferably from about 80–130° C. When polynitriles are employed, in contrast to mononitriles, it is preferable to maintain the reaction temperatures toward the lower side of said temperature ranges.

The time required to produce the desired products can vary widely and is, of course, dependent on the particular compounds employed, reaction conditions, and the like. Generally the time employed is in the range from about .25–100 hours, preferably from about 1–50 hours. Longer, or shorter, reaction times can of course be employed.

The use of inert diluents is not necessary to our process but their use can have practical value such as when the higher molecular weight organic nitriles are employed. Inert diluents, such as benzene, can also be used for the azeotropic removal of water from the amino alcohol or amino thiol and catalyst mixture if desired before the addition of the nitriles. Excess amino thiols or amino alcohols can also be suitably employed as diluent material to assure an intimate mixture of the reactants. If inert diluents are employed, hydrocarbons containing from about 4–12 carbon atoms per molecule such as benzene, toluene, and the like, are preferred.

Exclusion of the presence of free acids, in the reaction system, is essential to our process, and alkaline or neutral conditions should be maintained therein. If neutralization of the reaction system is necessary, additional amino thiol or amino alcohol can be added as well as other basic materials such as ammonia hydroxide, potassium hydroxide, and the like.

The order of addition of the foregoing components to the reaction vessel is not critical. It is preferable to admix the metal catalyst and amino alcohol or amino thiol prior to charging the organic nitrile.

The relative ratios of the starting materials employed can, of course, be widely varied. To provide the theoretical optimum yields the organic nitrile would be employed in quantities to provide one nitrilo group per each hydroxyl or thiol group of the amino alcohol or amino thiol used. It is preferred to employ an equivalent excess of the amino thiol or amino alcohol. Even small excesses are helpful in assuring complete and efficient reaction of organic nitrile and is favored. As hereinbefore stated excess amino alcohol or amino thiol serves also as a solvent and is easily removed from the product as, for example, by distillation. Correspondingly, the mol ratios of the amino alcohol or amino thiol to the organic nitrile is generally within the range from about 0.5/1 to 50/1, preferably about 1/1 to 5/1.

The amount of metal catalyst employed will vary depending upon the reaction conditions and the materials reacted. A catalytic quantity can be easily determined and accordingly employed to produce the desired products. The amount of metal catalyst used can be expressed in terms of gram atoms of the metal. The ratio of the mols of organic nitrile employed per gram of metal is generally in the range from about 10/1 to 300/1, preferably from about 20/1 to 200/1.

Metal catalysts that can be employed according to our invention to provide surprsingly high yields are selected from the first to fourth row inclusive of groups 1B, 2B, 6B, 7B and 8 (palladium excepted) as represented in the periodic table of the elements in the Handbook of Chemistry and Physics, Chemical Rubber Company, 45th edition (1964), page B–2. There is no particular form of metal catalyst required according to our process. Finely divided elemental metal, complexes, salts, and the like, can be used. It is generally preferred that the metal catalyst be soluble in the reaction medium. Suitable forms include the halides, such as chlorides; nitrates; phosphates; sulfates; acetates; acetylacetonates; octoates; and the like. Exemplary are chromium acetylacetonate, cobalt chloride, copper octoate, and the like. The metal salts of zinc or cadmium are the most preferred catalysts of this invention.

The amino alcohols and amino thiols that are employed according to our invention are selected from 1,2- or 1,3-amino alcohols or amino thiols. When preparing 2-oxazolines, 2-thiazolines, benzoxazoles, or benzothiazoles, the 1,2-amino alcohols or 1,2-amino thiols are employed as starting materials. When 1,3-oxazines or 1,3-thiazines are to be prepared the 1,3-amino alcohols or 1,3-amino thiols are respectively employed. The foregoing described amino alcohols or amino thiols can be represented by the following formula:

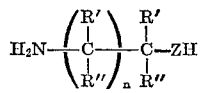

wherein Z represents oxygen or sulphur, n is an integer of 1 or 2, wherein R' and R" taken individually represent hydrogen or an organic radical containing from about 1 to 30 carbon atoms selected from alkyls, cycloalkyls, aryls, or alkylenes, and the like, the combinations thereof, such as alkaryl, aralkyl, or alkylcycloalkyl, and the like. Exemplary organic radicals are methyl, ethyl, propyl, isopropyl, butyl, isobutyl, t-butyl, 2-ethylhexyl, decyl, dodecyl, cyclopentyl, cyclohexyl, 2-methylcyclopentyl, ethylene, propylene, butylene, hexamethylene, phenylene, phenyl, benzyl, tolyl, ethylphenyl, phenylethyl, phenylpropyl, butylphenyl, allyl, 3-butenyl, 3-pentenyl, and the like. Said R' and R" organic radicals can be unsubstituted hydrocarbon radicals or they can contain substituted unreactive groups or atoms which do not materially affect the cyclization process of this invention, such as chlorophenyl, ethoxyethyl, and the like. In addition, when $n=1$ both R' radicals, or alternatively, both R" radicals, can represent divalent hydrocarbon radicals, which together with the carbon atoms in the amino alcohol or amino thiol can form a cycloaliphatic hydrocarbon nucleus or an aromatic hydrocarbon nucleus containing from about 4 to 8 carbon atoms, preferably 5 to 6 carbon atoms. Exemplary compounds thus defined are 2-aminocyclohexanol, 2-aminocyclopentanol, ortho-aminophenol, or ortho-aminobenzenethiol.

The following compounds are exemplary of 1,2- or 1,3-amino alcohols or amino thiols that can be suitably employed according to this invention. The thiol analogues to the representative alcohols have not been enumerated in order to avoid undue repetition. Exemplary compounds are monoethanolamine, 1-amino-2-propanol, 3-aminopropanol, 1-amino-1-phenyl-2-propanol, 1-amino-1-phenyl-3-propanol, 1-amino-2-phenyl-2-heptanol, 1-amino-2-benzyl-3-propanol, 1-amino-2-benzyl-2-propanol, 1-amino-2-octanol, 1-amino-3-dodecanol, 1-amino-cyclohexyl-3-propanol, 1-amino-2-allyl-3-propanol, 1-amino - cyclohexyl - 2- propanol, 1-amino-1-triacontryl-2-propanol, and the like.

The organic nitriles employed according to our invention can be mono- or polynitriles and can be represented according to the following formula:

$$R—(C\equiv N)_x$$

wherein R represents a mono- or polyvalent organic radical selected from saturated aliphatics; unsaturated aliphatics, including both conjugated and nonconjugated (other than alpha, beta unsaturation); saturated cycloaliphatics; mono- and diolefinic cycloaliphatics, including both conjugated and nonconjugated; aromatics; and nitrogen containing heterocyclics. Said R radicals preferably contain in the range of from about 1 to about 30 carbon atoms, and x represents an integer equal to the valence of the R radical and preferably is about 1 to 3. Exemplary R, organic radicals, are methyl, ethyl, ethylene, propyl, isopropyl, butyl, butylene, 2-ethylhexyl, dodecyl, eicosyl, triacontyl, cyclopentyl, cyclohexyl, 2-methylcyclopentyl, phenyl, phenylene, benzyl, benzylidene, naphthyl, phenylpropyl, tolyl, 3-butenyl, pyridyl, and the like. Representative organic nitriles corresponding to the above formulas include acetonitrile, valeronitrile, capronitrile, caprylonitrile, lauronitrile, myristonitrile, stearonitrile, 4-pentenenitrile, cyclohexanecarbonitrile, 1,1,3-cyclohexanetripropionitrile, toluinitrile, anthranilotrile, 4-cyanocyclohexene, naphthonitrile, adiponitrile, terephthalonitrile, isophthalonitrile, picolinonitrile, nicotinonitrile, isonicotinonitrile, and the like.

The compounds produced according to our invention can be represented by the following formula:

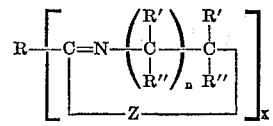

wherein R, R', R", n, Z are as hereinbefore defined, and wherein x is an integer equal to the valence of R and preferably is an integer from 1 to 3.

The compounds produced by our new process have widely recognized and diverse usages. They have been used as solvents, wetting and emulsifying agents, monomers for polymer synthesis, and as general chemical intermediates.

Illustrative of the foregoing discussion and description of our metal catalyzed process for synthesizing cyclic compounds from organic nitriles and amino alcohols or amino thiols, and not to be interpreted as a limitation on the scope thereof, or on the materials herein employed, the following examples are presented.

Example 1.—Synthesis of 2-phenyl-2-oxazoline

A 100 milliliter flask equipped with reflux condenser was charged with 20 grams monoethanolamine and 0.5 gram cobalt chloride hexahydrate. This mixture was warmed gently whereupon the cobalt chloride hexahydrate dissolved to give a clear, wine-red solution. Thirty-three grams of benzonitrile were added and a homogeneous solution was refluxed gently for four hours. During this period the color of the mixture changed from wine-red to blue-green and ammonia was evolved through the condenser.

The mixture was allowed to cool to room temperature and stand overnight. Distillation at reduced pressure gave 2.7 grams of recovered benzonitrile followed by 23.4 grams of product, boiling point 65° C. (2 millimeters). The product was identified as 2-phenyl-2-oxazoline by infrared analysis. The reaction that occurred can be depicted as follows:

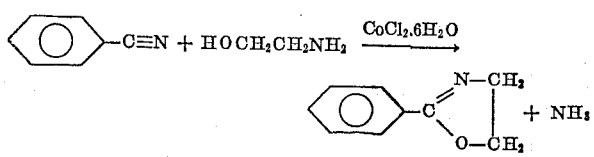

Example 2.—Synthesis of 2-n-propyl-2-oxazoline

Employing the procedure described in Example 1, 30.5 grams of monoethanolamine and 1.0 gram of cobalt chloride hexahydrate and 34.5 grams of n-butyronitrile were mixed and refluxed gently for 16 hours. Reflux temperature during this period rose from 120° to 145° C. and ammonia was evolved. That crude mixture was distilled at 17.5 to 18 millimeters pressure to give 23 grams of product, boiling point 48–49° C., which was identified as 2-n-propyl-2-oxazoline by infrared analysis.

Example 3.—Synthesis of 2,5-dimethyl-2-oxazoline

By this same procedure, 75.0 grams isopropanolamine, 41.0 grams acetonitrile and 1.5 grams cobalt acetate tetrahydrate were mixed and refluxed gently for one week at 97 to 100° C. with a constant evolution of ammonia. Catalyst residues and heavies were removed by stripping the reaction mixture using an inefficient column and the distillate was then fractioned using an efficient column. 25.8 grams of 2,5-dimethyl-2-oxazoline, boiling point 114–118° C./atmospheric pressure was recovered. The product was identified by infrared analysis.

The synthesis of 2,5-dimethyl-2-oxazoline was repeated by employing the same starting materials except that different catalysts were employed. Cadmium acetate dihydrate was employed as a catalyst and then a mixture of zinc oxide and zinc acetate dihydrate was used. The identity of the product produced by both catalyst systems was established by infrared analysis as 2,5-dimethyl-2-oxazoline.

Example 4

When using the same starting materials as described in Example 3 with a calcium acetate monohydrate catalyst, the reaction failed to develop and no ammonia was noted. Similar failures were obtained when calcium chloride was used as the catalyst.

Example 5.—Synthesis of 2-phenyl-2-oxazoline

Employing the procedures as described above, 0.33 mol of monoethanolamine and 0.33 mol of benzonitrile and an amount of metal component equivalent to 0.002 gram atoms of pure metal were mixed and refluxed gently for the time indicated in Table 1. The particular metal component that was employed is described in Table 1 as well. The percent 2-phenyl-2-oxazoline in crude products is G.L.C. area percent and represents only the amount of total sample which passed through the G.L.C. column.

TABLE 1

| Run No. | Reflux time (hours) | Catalyst | Percent 2-phenyl-2-oxazoline in crude |
|---|---|---|---|
| 1 | 7.0 | | 16.5 |
| 2 | 6.5 | Cobalt chloride hexahydrate | 92.5 |
| 3 | 4.5 | Cobalt acetate tetrahydrate | 89.6 |
| 4 | 5.0 | Cobalt metal-finely divided | 41.6 |
| 5 | 7.0 | Cobalt acetylacetonate | 82.7 |
| 6 | 6.5 | Chromium acetylacetonate | 68.3 |
| 7 | 6.5 | Nickel acetylacetonate | 66.5 |
| 8 | 6.5 | Ferric acetylacetonate | 76.3 |
| 9 | 6.5 | Copper (II) octoate | 62.7 |
| 10 | 6.5 | Mercuric acetate | 9.1 |
| 11 | 6.5 | Palladium acetylacetonate | 14.5 |

The foregoing examples demonstrate that the metals of this invention, or their salts or complexes, catalyze 2-oxazoline formation from nitriles and the 1,2-amino alcohols.

Example 6.—Synthesis of 2-(3-cyclohexenyl)-2-oxazoline

By the same procedures as described above, 101.1 grams of 4-cyanocyclohexene, 86.0 grams monoethanolamine and 1.5 grams cobalt acetate tetrahydrate were mixed and heated with gentle refluxing for 24 hours, during which time the temperature rose from about 97° to 176° C. with the constant evolution of ammonia. There was obtained 60 grams of product, boiling point 70° C./3 millimeters of pressure that was 99.1% pure by G.L.C. analysis. Infrared spectrum was consistent with the structure of 2-(3-cyclohexenyl)-2-oxazoline.

Example 7.—Synthesis of 2-benzylbenzoxazole 2-benzylbenzoxazole was synthesized according to the foregoing procedures by charging 54.5 grams ortho-aminophenol, 118.0 grams phenylacetonitrile and 2.0 grams cadmium acetate dihydrate to a flask. The reaction mixture was stirred and refluxed for 7.5 hours at 163° to 168° C. At the end of this period the rate of ammonia evolution was considerably decreased. The crude product was stripped as in previous examples and the distillate was fractionated. Thus 51.9 grams of 2-benzylbenzoxazole, boiling point 115–115.5° C./0.25 millimeters pressure was recovered. The product was identified by infrared and nuclear magnetic resonance analysis.

Example 8.—Synthesis of 2,2'-tetramethylene bis(2-oxazoline)

2,2' - tetramethylene bis(2-oxazoline) was synthesized by the same procedures as hereinbefore described. 108.8 grams adiponitrile, 122.2 grams monoethanolamine and 3.0 grams cadmium acetate dihydrate were mixed and heated for about 27 hours at 98° to 126° C. 115.3 grams of material at boiling point of 108° to 109° C./0.3 millimeter mercury were recovered. The material was identified as 2,2'-tetramethylene bis(2-oxazoline) by infrared and nuclear magnetic resonance analysis.

Example 9.—Synthesis of 2-t-butyl-2-oxazoline

By the same procedure 2-t-butyl-2-oxazoline was synthesized using 92 grams pivalonitrile, 122 grams monoethanolamine and 13.3 grams cadmium acetate dihydrate. The mixture was heated at reflux with stirring until a pot temperature of about 135° C. was reached. 77.3 grams of material, boiling point 135° to 139° C., was recovered and identified by infrared and nuclear magnetic resonance analysis as 2-t-butyl-2-oxazoline, 86% pure.

Example 10.—Synthesis of 2-p-phenylene-bis-2-oxazoline 2-p-phenylene-bis-2-oxazoline was synthesized by the same procedures described above. 25.6 grams terephthalonitrile, 122 grams ethanolamine and 2.66 grams cadmium acetate dihydrate were heated slowly in a flask, with stirring, to 115° C. The mixture was refluxed gently for two hours at 150° C. The mixture was cooled to room temperature and filtered. 28.5 grams dry crystalline 2-p-phenylene-bis-2-oxazoline was recovered and its identity confirmed by infrared and nuclear magnetic resonance analysis. Calculated percent nitrogen was 12.96%, found 12.98%.

Example 11.—Synthesis of 2-n-propylbenzothiazole

2 - n-propylbenzothiazole was prepared using the procedures described above. 62.5 grams ortho-aminobenzenethiol, 69.0 grams n-butyronitrile and 1.5 grams cobalt acetate tetrahydrate were mixed and heated to 99° to 111° C. for about 24 hours during which period ammonia was evolved through the condenser. 58.7 grams of material, boiling point 131° C./10 millimeters, was recovered. Infrared spectrum of the product confirmed the synthesis of 2-n-propylbenzothiazole.

The foregoing example effectively demonstrates employment of the amino thiols in lieu of amino alcohols according to the process described in this invention.

Example 12.—Synthesis of 2-methyl-5,6-dihydro-1,3-4H-oxazine 2-methyl-5,6-dihydro-1,3-4H-oxazine was prepared according to the procedures described above. Seventy-five grams of 3-aminopropanol, 41 grams acetonitrile and 1.5 grams cobalt acetate tetrahydrate were mixed and heated for 47 hours during which the temperature rose from 89° to 170° C. Ammonia was continuously evolved through the condenser. The crude product was fractionated at atmospheric pressure and 49.6 grams of product, boiling point 131° C./atmospheric pressure, was recovered. The product was 99.5% pure by G.L.C. analysis and its infrared and nuclear magnetic resonance spectra confirmed the synthesis of 2-methyl-5,6-dihydro-1,3-4H-oxazine.

The foregoing example effectively demonstrates the synthesis of a 6-membered heterocyclic ring employing 1,3-amino alcohols according to the process of this invention.

Example 13.—Synthesis of 1,3-phenylene bis(oxazoline)

A mixture of monoethanolamine 305 grams, zinc acetate, dihydrate 30.0 grams and benzene 100 milliliters was heated at reflux with stirring under nitrogen until 12 grams of an aqueous phase was separated in an attached Dean-Stark trap. The aqueous phase consisted of about equal parts of water and monoethanolamine. To the cooled nonaqueous phase was added 1,3-dicyanobenzene, 256 grams and the mixture heated for about 3 hours at 86° to 115° C. until ammonia gas ceased to evolve. The resulting product was cooled under nitrogen and then ground in a mortar with a mixture of 500 milliliters ice water and 200 milliliters concentrated aqueous ammonia, filtered, washed twice with 100 milliliters and twice with 200 milliliters of a mixture of 500 milliliters water and 200 milliliters concentrated aqueous ammonia and then dried in vacuum at 50° C. 388 grams of product identified as 1,3-phenylene bis(oxazoline) melting at 145° to 147° C. (12.91% N, theory 12.98% N) was produced.

The preceding examples can be repeated with similar success by substituting the generically and specifically described reactants and conditions of this invention for those employed in the examples. As will be evident to those skilled in the art, various modifications of this invention can be made or followed in light of the discussion and disclosure herein set forth without departing from the spirit or the scope thereof.

We claim:

1. In a process for the preparation of heterocyclic compound of the formula:

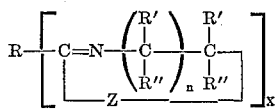

wherein R represents a mono- or polyvalent organic radical containing from 1 to 30 carbon atoms selected from alkyls; unsaturated hydrocarbon aliphatics, including both conjugated and nonconjugated (other than alpha, beta unsaturation); saturated hydrocarbon cycloaliphatics; mono- and diolefinic hydrocarbon cycloaliphatics, including both conjugated and nonconjugated; aromatic hydrocarbons; heterocyclics consisting of nitrogen, carbon and hydrogen; wherein Z represents oxygen or sulfur, wherein $n$ is an integer of 1 or 2, wherein $x$ represents an integer equal to the valence of the R radical, wherein R' and R'' taken individually represent hydrogen or an organic radical containing from about 1 to 30 carbon atoms selected from alkyls, cycloalkyls, hydrocarbon aryls, or alkylenes, and combinations thereof, and when $n=1$ both R' radicals, or alternatively, both R'' radicals, can represent divalent hydrocarbon radicals, which together with the carbon atoms in the amino alcohol or amino thiol, hereinafter described, can form a cycloaliphatic hydrocarbon nucleus or an aromatic hydrocarbon nucleus containing from 4 to 8 carbon atoms, the improvement which comprises contacting under alkaline or neutral conditions a 1,2- or 1,3-amino alcohol or amino thiol with an organic nitrile in the presence of a catalytic quantity of a metal catalyst selected from the first to fourth row, inclusive, of groups 1B, 2B, 6B, 7B and 8 of the periodic table of elements (palladium excepted); wherein said amino alcohol or said amino thiols can be represented by the following formula:

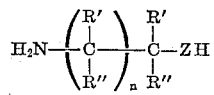

wherein Z represents oxygen or sulfur, wherein $n$, R', R'' are as hereinbefore defined; and wherein said organic nitrile can be represented according to the following formula:

$$R-(C\equiv N)_x$$

wherein R and $x$ are as hereinbefore defined.

2. The process according to claim 1 when said contacting is conducted in the presence of an inert hydrocarbon diluent containing from about 4 to about 12 carbon atoms per molecule and wherein $n$ is an integer of 1, and $x$ is an integer of 1 or 2.

3. The process according to claim 1 wherein $n$ is an integer of 1, and $x$ is an integer of 1 or 2.

4. The process according to claim 1 wherein $n$ is an integer of 2, and $x$ is an integer of 1 or 2.

5. The process according to claim 3 wherein said contacting is carried out at a temperature in the range of about 60 to 150° C. and for a time in the range from about 0.25 to 100 hours, wherein the mol ratio of said amino alcohol or amino thiol to said organic nitrile is within the range of about 0.5/1:50/1, and wherein the ratio of the mols of organic nitrile employed per gram atom of metal is in the range of about 10/1:300/1.

6. The process according to claim 4 wherein said contacting is carried out at temperature in the range of about 60 to 150° C. and for a time in the range from about 0.25 to 100 hours, wherein the mol ratio of said amino alcohol or amino thiol to said organic nitrile is within the range of about 0.5/1:50/1, and wherein the ratio of the mols of organic nitrile employed per gram atom of metal is in the range of about 10/1:300/1.

7. The process according to claim 5 wherein said contacting is carried out for a time within the range from about 1 to 50 hours, wherein the mol ratio of said amino alcohol or said amino thiol to said organic nitrile is within the range of about 1/1:5/1, and wherein the ratio of the mols of organic nitrile employed per gram atom of metal is in the range of about 20/1:200/1.

8. The process according to claim 6 wherein said contacting is carried out for a time within the range from about 1 to 50 hours, wherein the mol ratio of said amino alcohol or said amino thiol to said organic nitrile is within the range of about 1/1:5/1 and wherein the ratio of the mols of said organic nitrile employed per gram atom of metal is in the range of about 20/1:200/1.

9. The process according to claim 5 wherein said temperature is within the range of about 80° C. to 130° C. and wherein Z is oxygen.

10. The process according to claim 6 wherein said temperature is in the range of about 80° C. to 130° C. and wherein Z represents oxygen.

11. The process according to claim 5 wherein said temperature is in the range of about 80° C. to 130° C. and wherein Z represents sulfur.

12. The process according to claim 6 wherein said temperature is in the range of about 80° C. to 130° C. and wherein Z represents sulfur.

13. The process according to claim 5 wherein said metal catalyst is selected from cobalt, chromium, cadmium, nickel, zinc, iron, or copper.

14. The process according to claim 6 wherein said metal catalyst is selected from cobalt, chromium, nickel, iron, or copper.

15. The process according to claim 13 wherein said metal catalyst is soluble in the reaction medium.

16. The process according to claim 14 wherein said metal catalyst is soluble in the reaction medium.

17. The process according to claim 15 wherein said metal catalyst is selected from cobalt chloride hexahydrate, cobalt acetate tetrahydrate, cobalt acetylacetonate, cadmium acetate dihydrate, chromium acetylacetonate, nickel acetylacetonate, ferric acetylacetonate, zinc acetate dihydrate, or copper (II) octoate.

18. The process according to claim 16 wherein said metal catalyst is selected from cobalt chloride hexahydrate, cobalt acetate tetrahydrate, cobalt acetylacetonate, chromium acetylacetonate, nickel acetylacetonate, ferric acetylacetonate, or copper (II) octoate.

19. The process according to claim 13 wherein said metal catalyst is a cadmium or zinc salt.

20. The process according to claim 14 wherein said metal catalyst is a cadmium or zinc salt.

References Cited

UNITED STATES PATENTS

| | | | |
|---|---|---|---|
| 3,488,294 | 1/1970 | Annand et al. | 260—243 X |
| 3,402,178 | 9/1968 | Levy et al. | 260—244 |
| 3,316,256 | 4/1967 | Kano et al. | 260—244 |
| 2,402,198 | 6/1946 | Loder | 260—307 |

JOHN M. FORD, Primary Examiner

U.S. Cl. X.R.

260—244 R, 306.7, 307 F